United States Patent [19]

Riggs

[11] 4,200,183
[45] Apr. 29, 1980

[54] APPARATUS FOR MOVING GLASS CONTAINERS THROUGH A SERIES OF INSPECTION POSITIONS

[75] Inventor: Darius O. Riggs, Ottawa Lake, Mich.

[73] Assignee: Owens-Illinois, Inc., Toledo, Ohio

[21] Appl. No.: 936,973

[22] Filed: Aug. 25, 1978

[51] Int. Cl.² .................................................. B65G 19/02
[52] U.S. Cl. ............................................. 198/648; 198/476; 198/655; 209/912
[58] Field of Search ................ 198/339, 457, 476, 482, 198/597, 648, 655, 725, 726, 734; 209/912, 522–533

[56] References Cited

U.S. PATENT DOCUMENTS

| | | | |
|---|---|---|---|
| 1,843,522 | 2/1932 | Sprague | 198/482 X |
| 3,313,409 | 4/1967 | Johnson | 209/525 |
| 3,599,780 | 8/1971 | Sorbie | 198/655 |
| 3,710,937 | 1/1973 | Cook | 209/523 |
| 4,075,086 | 2/1978 | Marsh, et al. | 209/522 |

*Primary Examiner*—Jeffrey V. Nase

*Attorney, Agent, or Firm*—D. T. Innis; Myron E. Click; David H. Wilson

[57] ABSTRACT

Apparatus, as set forth, in which glass containers moving on a horizontal conveyor in an upright attitude are guided into a bottle-engaging pocket, while the pocket is in position at an entrance position. The pocket is one of a series which are connected together in an endless series. An indexing hub supports a plurality of circumferentially spaced rollers about its periphery, with the rollers acting similar to a sprocket. The hub is indexed by a suitable drive. The rollers, in cooperation with the endless series of bottle-engaging pockets, will move containers held in the pockets through a series of positions at which the containers may be gauged or inspected for various defects. A second hub, which is essentially the same as the previously described hub, also has a series of rollers which engage the series of pockets. This second hub is mounted for "idler type" rotation about its vertical axis. Each of the series of bottle-engaging pockets have interchangeable inserts to accommodate different sized bottles, and the hubs actually support two vertically spaced series of bottle-engaging pockets.

5 Claims, 3 Drawing Figures

APPARATUS FOR MOVING GLASS CONTAINERS THROUGH A SERIES OF INSPECTION POSITIONS

BACKGROUND OF THE INVENTION

In the handling of glass containers for inspecting the containers for various defects, such as vertical and horizontal checks in the finish, bottom checks or heel checks in the bottom or heel of the container, internal diameter of the finish, outer diameter, height, warp and dip and cocked finish all are familiar and presently carried out, inspections. For example, U.S. Pat. No. 3,313,409 issued Apr., 1967 to J. R. Johnson, discloses an apparatus in which the containers are indexed by a starwheel which is formed with pockets in its periphery at spaced intervals for the purpose of conveying the containers to be inspected into and out of a series of inspection positions. This prior art inspection apparatus described, actually has only five inspection positions or stations. Other inspections which could be carried out on containers when they are positioned in the inspection handling system may be, for example, wall thickness at various heights of the container sidewall, shoulder thickness or heel thickness, sidewall distribution, bottle diameter, etc.

As shown in the above-referred-to Johnson patent, a plurality of inspections may be performed at a single inspection station, provided the equipment that is used to make the inspections does not interfere with each other. In nearly all instances where a true inspection of the container circumference takes place, it is necessary that the container be rotated at least one complete revolution or alternatively, if the container is not rotated, it is necessary that the inspection equipment be rotated about the container's axis. Many of the inspection devices are optical, such as specifically shown and described with respect to FIGS. 13 and 14 of the Johnson patent. It can readily be seen that with a device such as that shown in the Johnson patent, only five inspection stations are provided, and while the particular illustration in the Johnson patent relates to the inspection of small ware, similar inspection equipment for larger diameter ware may be utilized by replacing a starwheel, as shown in the Johnson device, with other starwheels with much larger pockets. The design of the machine has been such that the largest diameter of the ware inspected by the equipment limits the utilization of the system to a five-station inspection device.

With this in mind, it is an object of the present invention to provide a handling system that is compatible with inspection equipment which has nine useable inspection positions, the containers being moved through these successive inspection positions by the equipment of the invention.

It is an additional object of this invention to provide apparatus for moving the containers through a successive series of positions by indexing a plurality of bottle-engaging pockets.

SUMMARY OF THE INVENTION

Apparatus for indexing containers from station to station of a plural station ware inspection device wherein a plurality of bottle-engaging pocket members in the form of an endless chain are supported by a pair of spaced-apart, vertically extending hubs with an index drive means connected to one of the hubs for indexing the pocket members.

Figure 1:
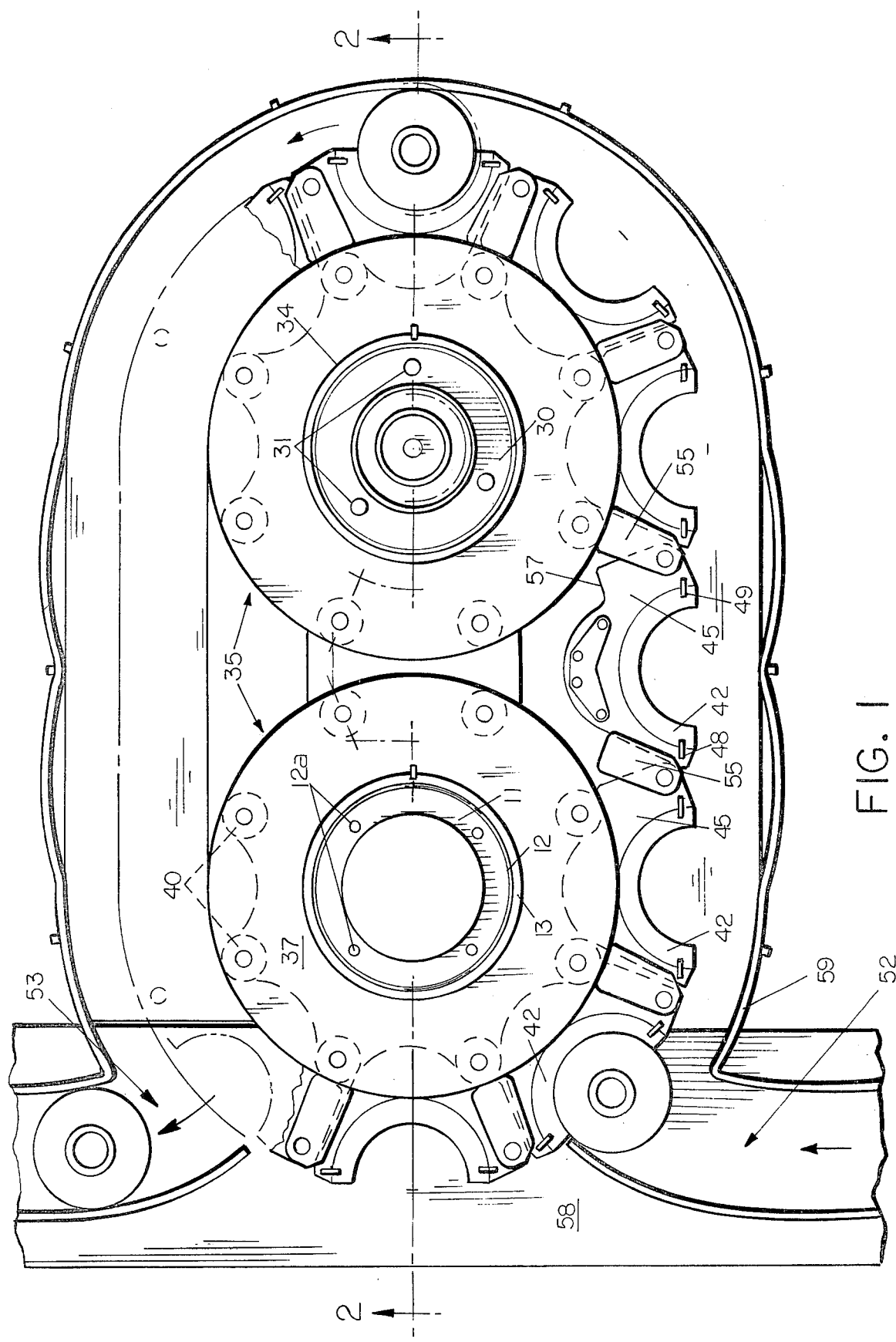
FIG. 1 is a top plan view of the apparatus of the invention.

With particular reference to the drawings, the following detailed description of the apparatus of the invention is provided.

Indexing drive mechanism (not shown) is connected to a central shaft 10, it being understood that the drive mechanism for the shaft 10 is essentially the same as that disclosed in U.S. Pat. No. 3,313,409. Generally speaking, the drive mechanism consists of an indexing drive for rotation of the shaft 10. The shaft 10 at its upper end carries a mounting plate 11. The mounting plate 11 is provided with four mounting holes through which bolts 12a extend and engage with the complementary threaded openings carried in an inwardly extending, annular flange 12 of a generally cylindrical mounting hub 13. The indexing mechanism for the shaft 10 is provided in a support member 14, it being understood that the support is on a pedestal 15 which may rest on the floor.

Figure 2:
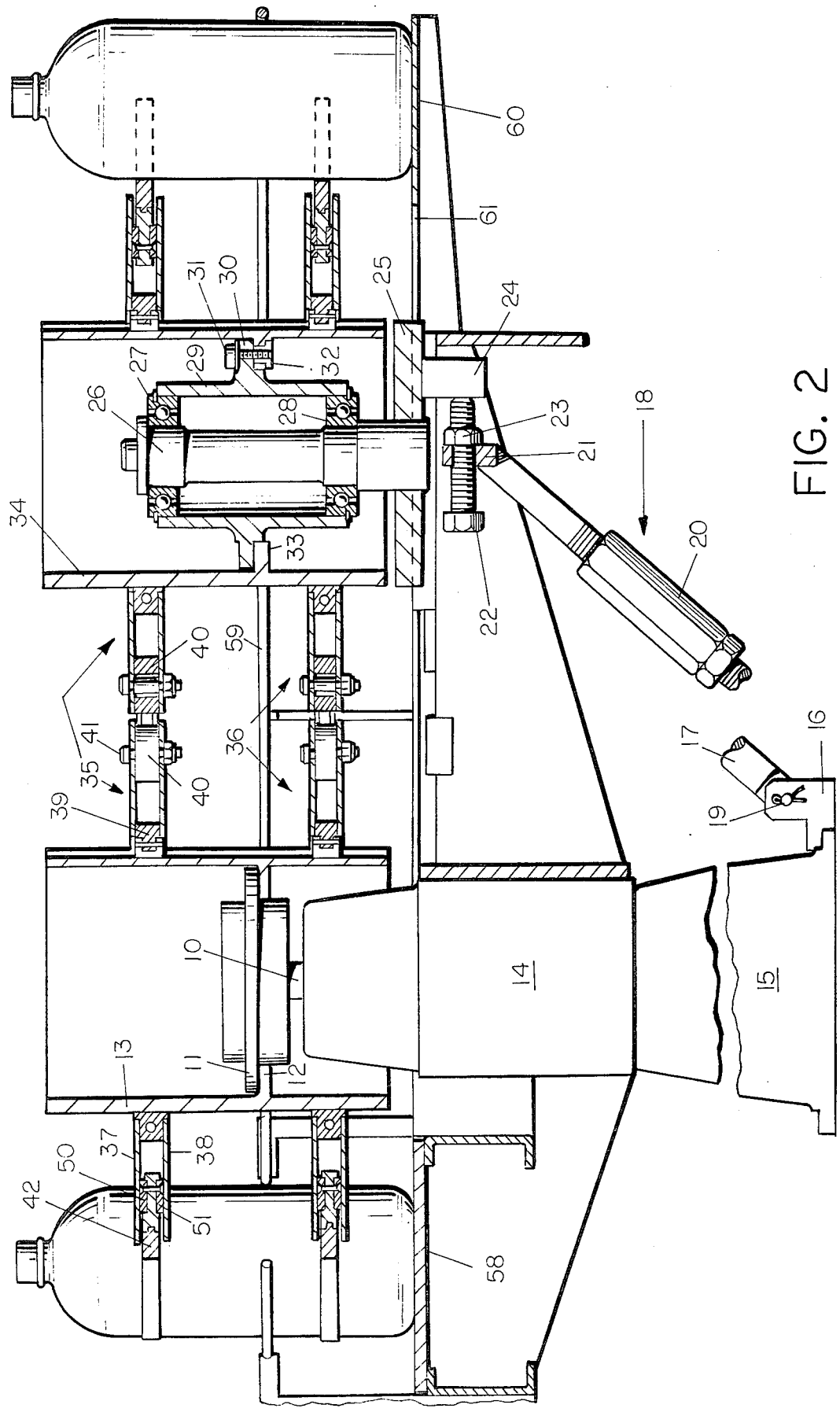
FIG. 2 is a vertical, sectional view taken at line 2—2 of FIG. 1.

As specifically shown in FIG. 2, the pedestal 15 is broken away; however, the bottom of the pedestal is shown as having a bracket 16 to which a lower portion 17 of an adjustable arm, generally indicated by 18, is pivotally connected by a pin 19. The arm 18 is provided, intermediate its length, with a threaded adjusting member 20 while the upper end of the arm 18 is formed with an internally threaded boss 21 through which a bolt 22 is threaded. A lock nut 23 is provided on the bolt 22, it being understood, as shown in FIG. 2, that the end of the bolt 22 engages a boss 24. The boss 24 is fixed to the underside of a horizontally movable plate 25. The plate 25 carries a vertically extending shaft 26 which in turn carries a pair of vertically spaced roller bearings 27 and 28. The outer races of the bearings 27 and 28 support a cylindrical mounting member 29, with the member 29 having a radially extending flange 30 intermediate its height. The flange 30, as best shown in FIG. 1, is provided with three vertically extending bolts 31 which thread into threaded bushings 32 carried by an inwardly extending annular flange 33 of a second generally cylindrical mounting hub 34.

Both the hubs 13 and 34 are provided with a pair of vertically spaced plate-like members or discs generally designated 35 and 36. The upper member or disc 35 actually comprises a pair of annular members 37 and 38 fastened to opposed sides of an annular ring 39. It should be understood that the ring 39 is adjustable relative to the hub in a similar manner to the rings described in U.S. Pat. No. 3,599,780, issued Aug. 17, 1971.

Adjacent the periphery of the radially extending members 37 and 38 are located a plurality of circumferentially spaced rollers 40. The rollers 40 are pivotally supported on vertical axes by pins 41. In a similar manner, the plate-like members 36 likewise are comprised of annular, radially extending members which support a plurality of rollers. As can be seen in FIG. 2, the rollers 40 associated with the hub 13 are shown in full line, while the rollers 40 associated with the hub 34 are shown in section. Again, it should be understood that the roller supporting members 35 and 36, carried by both hubs 13 and 34, are vertically adjustable relative to the hubs for accommodating the apparatus of the invention for various sizes and heights of containers.

Figure 3:
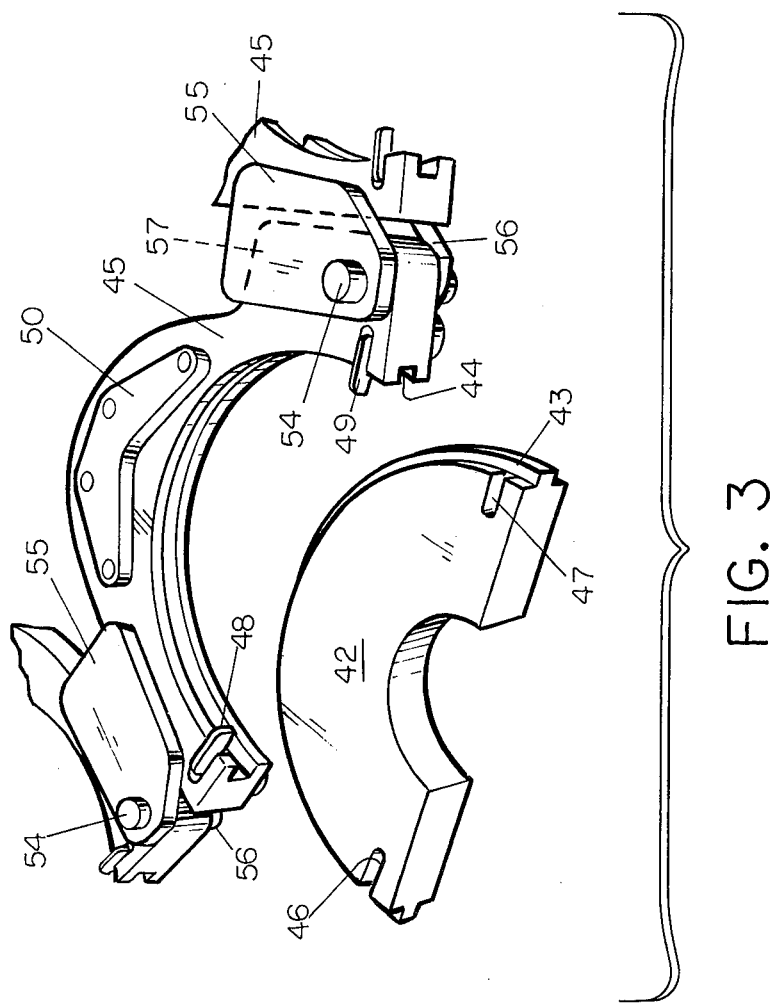
FIG. 3 is an enlarged perspective view of one of the pocket members forming a part of the invention.

Container-engaging pocket members 42 present a generally semi-annular shape and are provided with tongues 43, as best shown in FIG. 3, adapted to fit within grooves 44 of a pocket member holder 45. Inwardly extending grooves 46 and 47, as best shown in FIG. 3, are provided in the pocket members 42 adjacent the forward edges thereof and within which the bent ends of keys 48 and 49 are adapted to engage upon assembly of the pocket members 42 within the holders 45. It should be understood that the keys 48 and 49 may be spring-biased downwardly within the holders 45. With the pocket members 42 assembled in the holder 45 and the keys 48 and 49 in engagement with the grooves, the pocket members will be retained in their respective holders 45.

Each holder 45 is provided with a top and bottom wear plate 50 and 51 which will be engaged by the inner surfaces of the members 37 and 38 during the movement of the series of holders 45 in an indexing movement from an inlet end 52 to an outlet end 53 of the container-handling system. Adjacent holders 45 are pivotally interconnected by a vertical pivot pin 54 which extends through a pair of spaced-apart cam plates 55 and 56. The cam plates 55 and 56 are welded to the left-hand side of the holders 45 as viewed in FIGS. 1 and 3. In addition to the cam plates 55 and 56, each of the holders 45 is provided with a shoulder portion 57 and, as can best be seen in FIG. 1, the shoulder portion 57 of each of the holders will engage the rollers 40 in much the same way as the sprocket of a chain drive would engage chain rollers. Furthermore, each of the plates 55 and 56 also will engage the rollers as the series-connected holders are moved through the sequence of movement in the direction shown in FIG. 1, since they are of essentially the same length as the holder in the portion containing the shoulder 57.

It should be understood that a horizontal conveyor 58 moves the ware positioned thereon in the direction of the inlet 52 at which point the ware will be engaged in the pocket member 42 positioned at the inlet end. Each indexing movement of the drive for the hub 13 will move the ware from the inlet end to the right, as viewed in FIG. 1, with the ware being retained within the pocket member by a rail 59 which extends generally about both hubs 13 and 34 and to the outlet end 53 of the apparatus. At the outlet 53, the ware will be moved back onto the conveyor 58 which is moving in the direction of the arrow thereon and will then carry the ware so positioned out of the pocket member 42 to resume its movement on the conveyor. Additional rails also may be provided on the conveyor to generally guide the ware into the pocket members and out of the pocket members.

From the foregoing description of the apparatus, it may be seen that the relative adjustability of the axes of hubs 34 and 13 will provide for a means to take up slack due to wear in the series of holders or to maintain a degree of tension to retain the holders in contact with the rollers. When the apparatus of the invention is used for the inspection of glassware, the ware will be indexed one position each interval until such time as a single piece of ware has moved from the inlet to the outlet. During this movement, the ware will have been at nine positions where it may be inspected. During the movement from the inlet to the outlet, the ware is supported by a plate 60 which underlies the ware at all of the stations; however, it should be understood that at some positions this plate may be interrupted to provide for a bottom-engaging container rotating means. It should also be understood that the plate 25 is adjustable relative to the plate 60 by its movement within a cutout 61 formed in the plate 60.

It should be apparent that other means than the rod 59 may be used to maintain the containers within the general confines of the individual pockets and essentially the invention is to provide a mechanism that will handle glass containers through a series of inspection stations.

I claim:

1. Apparatus for indexing containers from station to station of a plural station ware inspection machine, comprising:

a pair of spaced-apart, vertically extending hubs;

disc means connected to each said hub, said discs being in the same horizontal plane;

index drive means connected to one of said hubs for indexing said one hub about its axis;

a plurality of bottle-engaging pocket members;

said pocket members comprising generally C-shaped members pivotally connected to each other;

said C-shaped members being formed with a groove on the inside of the "C;"

interchangeable C-shaped inserts releasably mounted in said members and having a tongue on the exterior thereof adapted to fit in the groove of said members;

spring-biased retaining means for holding said inserts in said members; and means interconnecting said pocket members in the form of an endless chain, said chain of pocket members encompassing said pair of spaced discs and being supported thereby, whereby indexing of one disc indexes the other disc through the chain of pockets.

2. The apparatus of claim 1 further including key means carried by said pocket members for engagement with said inserts for fixing said inserts in said pocket members.

3. Apparatus for indexing containers from station to station of a plural station ware inspection machine, comprising:

a pair of spaced-apart, vertically extending hubs;

disc means connected to each said hub, said discs being in the same horizontal plane and formed as a pair of spaced plates;

index drive means connected to one of said hubs for indexing said one hub about its axis;

a plurality of bottle-engaging pocket members;

means interconnecting said pocket members in the form of an endless chain, said chain of pocket members encompassing said pair of spaced discs and being supported thereby; and roller means between said plates for engaging said chain of pocket members whereby indexing of one disc indexes the other disc through the chain of pockets.

4. The apparatus of claim 3 wherein said pocket members are formed with horizontally extending cam members adjacent the pivotal connection of each member to the next adjacent member and said roller means engage said cam members.

5. The apparatus of claim 3 wherein said roller means comprises a plurality of circumferentially spaced rollers mounted adjacent the periphery of said discs.

* * * * *